United States Patent
Marocchini et al.

(10) Patent No.: US 9,303,660 B2
(45) Date of Patent: Apr. 5, 2016

(54) VALVES WITH METERING SLEEVES

(71) Applicant: Hamilton Sundstrand Corporation, Charlotte, NC (US)

(72) Inventors: Francis P. Marocchini, Somers, CT (US); Glenn Gradischer, Canton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 182 days.

(21) Appl. No.: 14/224,674

(22) Filed: Mar. 25, 2014

(65) Prior Publication Data

US 2015/0275933 A1 Oct. 1, 2015

(51) Int. Cl.
*F15B 13/04* (2006.01)

(52) U.S. Cl.
CPC ....... *F15B 13/0402* (2013.01); *Y10T 137/4273* (2015.04); *Y10T 137/4336* (2015.04); *Y10T 137/8671* (2015.04)

(58) Field of Classification Search
CPC ........... F15B 13/0402; Y10T 137/8671; Y10T 137/4273; Y10T 137/4336
USPC .................................. 137/538, 540, 242, 244
See application file for complete search history.

(56) References Cited

U.S. PATENT DOCUMENTS

| | | | |
|---|---|---|---|
| 5,215,116 A * | 6/1993 | Voss | F16K 17/04 137/494 |
| 5,396,924 A | 3/1995 | Voss | |
| 7,445,018 B1 * | 11/2008 | Morando | F16K 3/0263 137/15.07 |
| 8,511,329 B1 | 8/2013 | Rickis et al. | |
| 2014/0053927 A1 * | 2/2014 | Podgorski | F02C 6/08 137/596 |

OTHER PUBLICATIONS

UK Search Report for application No. GB-1504949.7 dated Sep. 17, 2015.

* cited by examiner

*Primary Examiner* — Kevin Lee
(74) *Attorney, Agent, or Firm* — Locke Lord LLP; Scott D. Wofsy; Joshua L. Jones

(57) ABSTRACT

A valve includes a housing having an inlet and an outlet. A spool is fixed within the housing and defines a flow window therethrough for fluid communication between the inlet and the outlet. A piston is slidingly engaged in a piston compartment of the spool. A sleeve is slidingly engaged with the spool on an outer surface of the spool. The piston and sleeve are operatively connected for common motion along a sliding axis relative to the spool and housing between a first position in which the sleeve occludes the flow window to inhibit flow from the inlet to the outlet, and a second position in which the sleeve unoccludes the flow window to allow flow from the inlet to the outlet.

15 Claims, 2 Drawing Sheets

VALVES WITH METERING SLEEVES

BACKGROUND OF THE INVENTION

1. Field of the Invention

The present disclosure relates to valves, and more particularly to hydraulic valves such as minimum pressure shut-off valves, high pressure relief valves, fluid metering valves, pressure regulating valves, and the like.

2. Description of Related Art

Hydraulic valves such as minimum pressure shut-off valves, high pressure relief valves, fluid metering valves and pressure regulating valves are used in a variety of industrial and aerospace applications. All of these valves incorporate matched diameters with metering edges. The valves have typically been optimized to be as resistant as possible over time to contamination. However, they still suffer from the pressure and fluid flow forces driving contaminates into tight clearances. When the valves are open and flowing, contaminates in the fluid stream are directed into the tight clearances by pressure gradients and fluid momentum. When the valves are closed the pressure gradient is the greatest at the metering edges. The pressure gradients drive leakage paths, which result in contaminates being driven into the clearances such as diametrical clearances. In addition, the contaminates remain in the non-flowing areas of the metering edges. Over time contaminates have been shown to bind in these zones of valves, and can eventually result in the need for maintenance and/or valve replacement.

Such conventional methods and systems have generally been considered satisfactory for their intended purposes. However, there is still a need in the art for improved valves. The present disclosure provides a solution for this need.

SUMMARY OF THE INVENTION

A valve includes a housing having an inlet and an outlet. A spool is fixed within the housing and defines a flow window therethrough for fluid communication between the inlet and the outlet. A piston is slidingly engaged in a piston compartment of the spool. A sleeve is slidingly engaged with the spool on an outer surface of the spool. The piston and sleeve are operatively connected for common motion along a sliding axis relative to the spool and housing between a first position in which the sleeve occludes the flow window to inhibit flow from the inlet to the outlet, and a second position in which the sleeve unoccludes the flow window to allow flow from the inlet to the outlet.

In certain embodiments, in the first position a first lap length is defined between the spool and sleeve from the flow window to an end of the sleeve opposite the inlet, and a second lap length is defined between the spool and sleeve from the flow window to an end of the sleeve proximate the inlet. The first lap length is longer than the second lap length to discourage contaminant build up between the spool and sleeve.

In another aspect, the flow window and outlet can be substantially radially aligned. The flow window and outlet can be axially proximate to one another with respect to the sliding axis. It is contemplated that there can be a plurality of flow windows defined through the spool for fluid communication between the inlet and the outlet. The flow windows can all be axially proximate to the outlet with respect to the sliding axis. It is also contemplated that the flow windows can be spaced apart regularly in a circumferential direction to provide a pressure balance for concentric movement of the sleeve relative to the spool.

The spool can include an impingement wall dividing the piston compartment from an upstream compartment of the spool. The impingement wall can be proximate the flow window to absorb fluid momentum forces to reduce contaminant impingement proximate the flow window. The impingement wall can define a restrictor orifice therethrough for fluid communication between the upstream compartment and the piston compartment to provide for dampened motion of the piston.

The valve can include a piston rod mounted to the piston and a pin mounting the sleeve to the piston rod for common movement of the piston and sleeve. A spring seat can be mounted in the piston compartment of the spool. A piston spring can be mounted in compression between the spring seat and piston to urge the piston towards the first position. The spring seat can define at least one damper bore therethrough for damping fluid flow passing through the spring seat from a portion of the piston compartment between the piston and spring seat. It is contemplated that a screen can be mounted to the spool in a flow path between the inlet and the flow window.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
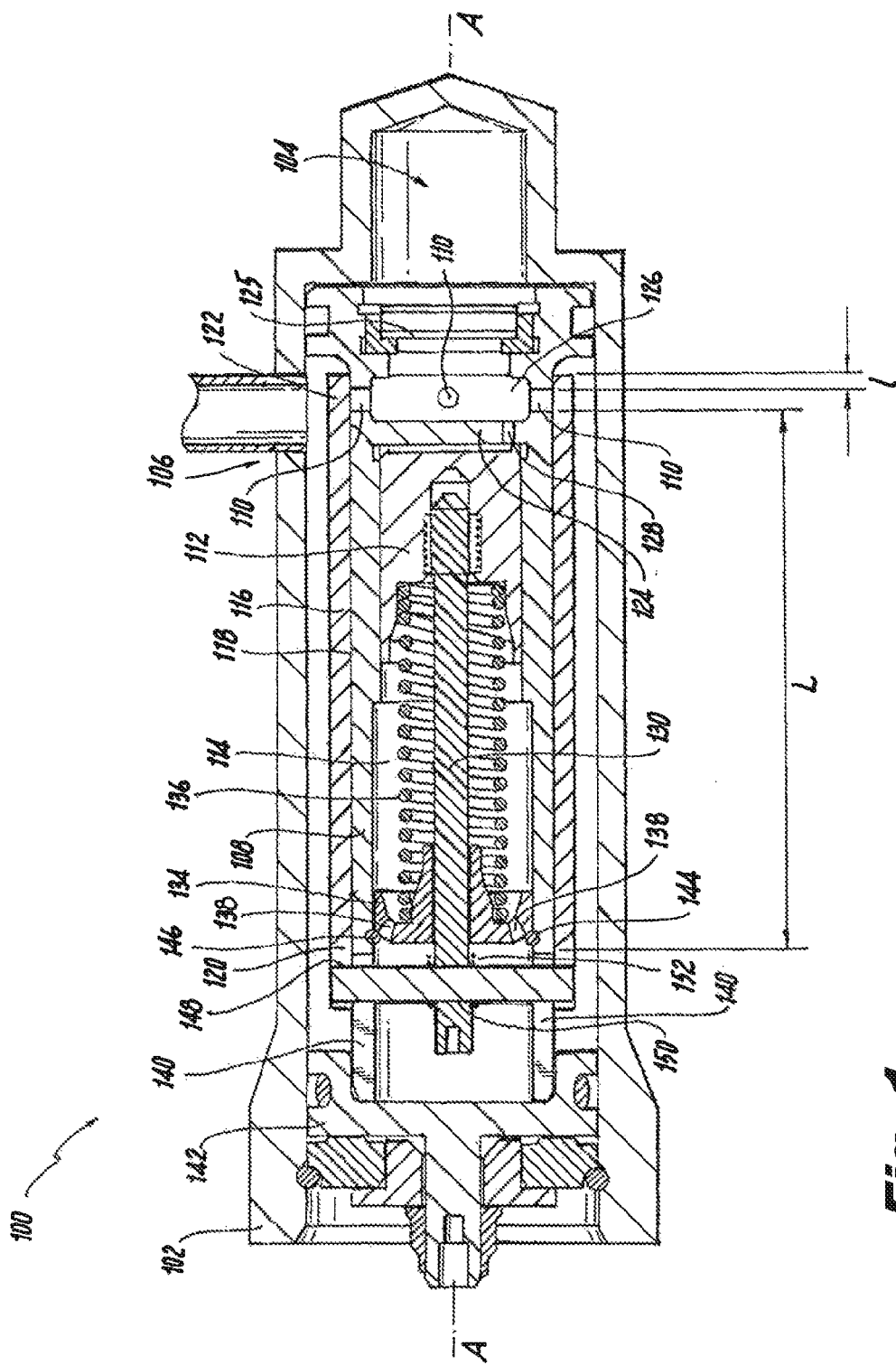
FIG. 1 is a cross-sectional side elevation view of an exemplary embodiment of a valve constructed in accordance with the present disclosure, showing the valve in the closed or shut-off position.
Figure 2:
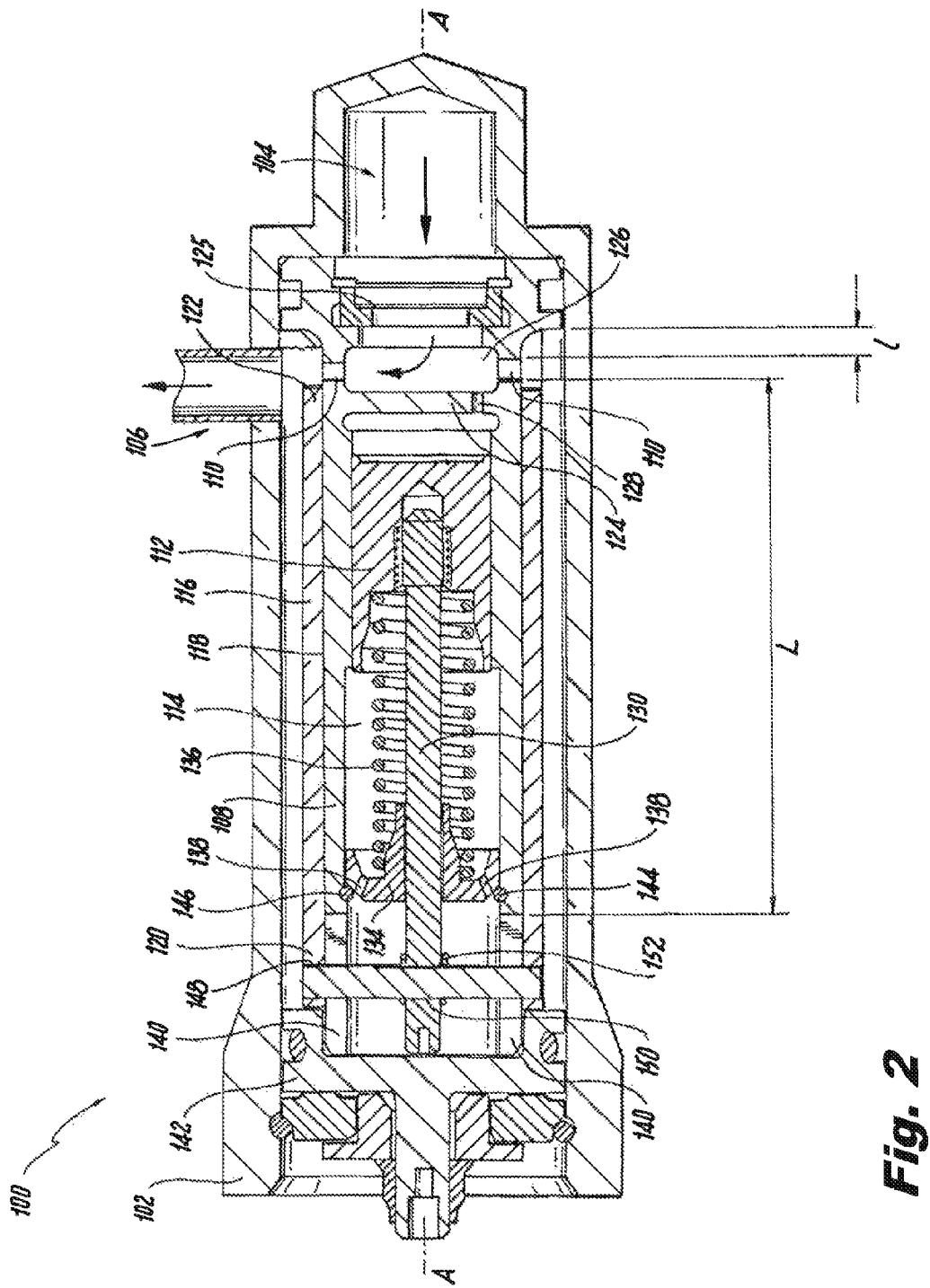
FIG. 2 is a cross-sectional side elevation view of the valve of FIG. 1, showing the valve in the fully open and flowing position.

Reference will now be made to the drawings wherein like reference numerals identify similar structural features or aspects of the subject disclosure. For purposes of explanation and illustration, and not limitation, a partial view of an exemplary embodiment of a valve in accordance with the disclosure is shown in FIGS. 1-2 and is designated generally by reference character 100. The systems and methods described herein can be used in valves, for example, to reduce contaminates accumulating in matched diameters, diametral clearances, metering edges, and the like.

Valve 100 includes a housing 102 having an inlet 104 and an outlet 106. Fluid flow enters valve 100 axially through inlet 104 and exits radially through outlet 106 as indicated by the flow arrows in FIG. 2. Those skilled in the art will readily appreciate that valve 100 can be made as a self-contained cartridge that can be built and test as a sub-assembly and installed directly into a main assembly such as a fuel system.

A spool 108 is fixed within housing 102 and defines a plurality of flow windows 110 therethrough for fluid communication between inlet 104 and the outlet 106. A piston 112 is slidingly engaged in a piston compartment 114 of spool 108.

A sleeve 116 is slidingly engaged with spool 108 on an outer surface 118 of spool 108. Piston 112 and sleeve 116 are operatively connected for common motion along a sliding axis "A" relative to spool 108 and housing 102 between a first position in which sleeve 108 occludes flow windows 110 to inhibit flow from inlet 104 to the outlet 106 as shown in FIG. 1, and a second position in which sleeve 116 unoccludes flow windows 110 to allow flow from inlet 104 to the outlet 106 as indicated by the large arrows in FIG. 2.

In the first position, shown in FIG. 1, a first lap length "L" is defined between spool 108 and sleeve 116 from flow window 110 to an end 120 of sleeve 116 opposite inlet 104. A second lap length "l" is defined between spool 108 and sleeve 116 from flow window 110 to an end 122 of sleeve 116 proximate inlet 104. The first lap length "L" is considerably longer than the second lap length "l", which discourages contaminant build up between spool 108 and sleeve 116. The first lap length "L" is not a path of least resistance for leakage, so leakage will tend to take the less resistive path presented by second lap length "l". To the extent that the leakage drives contaminates into the interface between spool 108 and sleeve 116 by way of second lap length "l", they will tend to be confined to the region of the interface proximate flow windows 110, and such contaminates can be flushed when sleeve 116 is moved to clear flow windows 110 to open valve 100.

One of the flow windows 110 is substantially aligned radially with outlet 106 relative to axis A. In the exemplary embodiment shown in FIGS. 1 and 2, there are four flow windows 110, spaced apart 90° from one another about axis A. The flow windows 110 are all axially proximate to outlet 106 with respect to axis A. Any other suitable number of flow windows can be included, and having flow windows 110 spaced apart regularly in a circumferential direction can provide a pressure balance for concentric movement of sleeve 116 relative to spool 108. In addition, this pressure balance allows for eccentric movement of sleeve 116, e.g., to allow passage of a larger particle between sleeve 116 and spool 108 in the event a larger particle is encountered. Flow windows 110 are depicted as cylindrical, however those skilled in the art will readily appreciate that different window shapes can be used, for example to provide scheduled metering of flow through valve 100.

Spool 108 includes an impingement wall 124 dividing piston compartment 114 from an upstream compartment 126 of spool 108. Impingement wall 124 is proximate flow windows 110 to absorb fluid momentum forces from incoming fluid, as indicated by the bent arrow in FIG. 2, to reduce contaminant impingement proximate the flow windows 110. Impingement wall 124 defines a restrictor orifice 128 therethrough for fluid communication between upstream compartment 126 and piston compartment 114 to provide for dampened motion of piston 112. Those skilled in the art will readily appreciate that the comparative amount of flow through restrictor orifice 128 is very small compared to the overall flow through valve 100, therefore the potential for contaminates passing into piston compartment 114 is limited accordingly.

Contaminates subjected to fluid momentum are not driven into diametrical clearances, e.g., between sleeve 116 and spool 108, because the tight clearances are not exposed until downstream of where the fluid turns to exit the valve radially. Valve 100 redirects fluid against a fixed solid wall, i.e., impingement wall 124, and the fluid is vectored out radially through outlet 106. Contaminates are thus shot out and away from the matched fits clearance of spool 108 and sleeve 116. When the valve 100 is open and flowing, the flow windows 110 are is self-cleaning, preventing contamination build-up. These features can significantly improve the contamination resistance of matched valve assemblies.

An optional screen 125 can be mounted to spool 108 in the flow path between inlet 104 and the area of flow windows 110 and impingement wall 124. Screen 125 can serve as a filter to screen particulates in the flow path. For example, if valve 100 is used as a valve for fuel, screen 125 can serve as a fuel filter.

Valve 100 includes a piston rod 130 mounted to piston 112 and a pin 132 mounting sleeve 116 to piston rod 130 for common movement of piston 112 and sleeve 116. A spring seat 134 is mounted in piston compartment 114, and a piston spring 136 is mounted in compression between spring seat 134 and piston 112 to urge the piston towards the first position shown in FIG. 1. Spring seat 134 defines damper bores 138 therethrough for damping fluid flow passing through spring seat 134 from the portion of piston compartment 114 between piston 112 and spring seat 134.

At a calibrated pressure level, sleeve 116 translates to expose the flow windows 110, thus allowing the fluid to exit radially from inlet 104 through the flow windows 110. Valve 100 can be calibrated to produce a scheduled window opening based on the pressure gradient across the variable flow windows. The motion of the translating sleeve 116 is driven by piston 112, which responds to the pressure gradient across the face of piston 112. The inlet pressure is communicated to the face of piston 112 thru restrictor orifice 128. The inlet pressure is directed through restrictor orifice 128 to minimize any fluid momentum forces and dampen the motion of piston 112. To provide smooth motion and prevent binding, piston rod 130 is guided by the spring seat 134. To prevent rotating motion of sleeve 116, slots 140 are provided in the end of spool 108 remote from inlet 104 and outlet 106. Pin 132 slides axially in slots 140. The minimum stop is controlled by piston 112 bottoming out against the spool 108, i.e., against the side of impingement wall 124 inside piston compartment 114. The maximum stop is controlled by the connecting rod bottoming out on closure disc 142 at the end of housing 102 as shown in FIG. 2.

An exemplary method for assembly of valve 100 is as follows. Piston 112 is threaded to piston rod 130. Piston 112 and piston rod 130 are then installed into the piston compartment 114 of spool 108. Piston spring 136 is placed into spring seat 134, which is then assembled over piston rod 130 and pressed toward piston 112 to a point beyond the c-ring groove 144 to allow assembly of c-ring 146 into c-ring groove 144. Once c-ring 146 is snapped into c-ring groove 144, the piston assembly is contained in spool 108. Sleeve 116 is then slid over spool 108. The retaining holes 148 of sleeve 116 are aligned to the pin hole 150 in piston rod 130. Pin 132 can then slide through sleeve 116 and piston rod 130. Two external retaining rings 152 assembled on both sides of piston rod 130 retain pin 132.

One potential benefit of valve 100 is providing additional robustness in potentially contaminated fluid environments compared to traditional valves. In addition, a potential advantage is that valve 100 can eliminate the ill effects of fluid momentum on valve performance. The cartridge configuration can allow preassembly and test of valve 100 for plug-in performance with interchangeability of assemblies. While shown and described in the exemplary context of fuel valves, those skilled in the art will readily appreciate that the devices and methods described herein can readily be applied to any suitable hydraulic modulating valves which benefit from added robustness in potentially contaminated fluid environments.

The methods and systems of the present disclosure, as described above and shown in the drawings, provide for valves with superior properties including resistance to contaminates. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A valve comprising:
    a housing having an inlet and an outlet;
    a spool fixed within the housing and defining a flow window therethrough for fluid communication between the inlet and the outlet;
    a piston slidingly engaged in a piston compartment of the spool; and
    a sleeve slidingly engaged with the spool on an outer surface of the spool, wherein the piston and sleeve are operatively connected for common motion along a sliding axis relative to the spool and housing between a first position in which the sleeve occludes the flow window to inhibit flow from the inlet to the outlet, and a second position in which the sleeve unoccludes the flow window to allow flow from the inlet to the outlet.

2. A valve as recited in claim 1, wherein in the first position a first lap length is defined between the spool and sleeve from the flow window to an end of the sleeve opposite the inlet, wherein in the first position a second lap length is defined between the spool and sleeve from the flow window to an end of the sleeve proximate the inlet, and wherein the first lap length is longer than the second lap length to discourage contaminant build up between the spool and sleeve.

3. A valve as recited in claim 1, wherein the flow window and outlet are substantially radially aligned.

4. A valve as recited in claim 1, wherein the flow window and outlet are axially proximate to one another with respect to the sliding axis.

5. A valve as recited in claim 1, wherein the flow window is a first flow window and further comprising at least one additional flow window defined through the spool for fluid communication between the inlet and the outlet.

6. A valve as recited in claim 5, wherein the flow windows are axially proximate to the outlet with respect to the sliding axis.

7. A valve as recited in claim 5, wherein the flow windows are spaced apart regularly in a circumferential direction to provide a pressure balance for concentric movement of the sleeve relative to the spool.

8. A valve as recited in claim 1, wherein the spool includes an impingement wall dividing the piston compartment from an upstream compartment of the spool.

9. A valve as recited in claim 8, wherein the impingement wall is proximate the flow window to absorb fluid momentum forces to reduce contaminant impingement proximate the flow window.

10. A valve as recited in claim 8, wherein the impingement wall defines a restrictor orifice therethrough for fluid communication between the upstream compartment and the piston compartment to provide for dampened motion of the piston.

11. A valve as recited in claim 1, further comprising:
    a piston rod mounted to the piston; and
    a pin mounting the sleeve to the piston rod for common movement of the piston and sleeve.

12. A valve as recited in claim 1, further comprising:
    a spring seat mounted in the piston compartment of the spool; and
    a piston spring mounted in compression between the spring seat and piston to urge the piston towards the first position.

13. A valve as recited in claim 12, wherein the spring seat defines at least one damper bore therethrough for damping fluid flow passing through the spring seat from a portion of the piston compartment between the piston and spring seat.

14. A valve as recited in claim 1, further comprising a screen mounted to the spool in a flow path between the inlet and the flow window.

15. A valve comprising:
    a housing having an inlet and an outlet;
    a spool fixed within the housing and defining a flow window therethrough for fluid communication between the inlet and the outlet;
    a piston slidingly engaged in a piston compartment of the spool, wherein the spool includes an impingement wall dividing the piston compartment from an upstream compartment of the spool, wherein the impingement wall is proximate the flow window to absorb fluid momentum forces to reduce contaminant impingement proximate the flow window, wherein the impingement wall defines a restrictor orifice therethrough for fluid communication between the upstream compartment and the piston compartment to provide for dampened motion of the piston; and
    a sleeve slidingly engaged with the spool on an outer surface of the spool, wherein the piston and sleeve are operatively connected for common motion along a sliding axis relative to the spool and housing between a first position in which the sleeve occludes the flow window to inhibit flow from the inlet to the outlet, and second position in which the sleeve unoccludes the flow window to allow flow from the inlet to the outlet, wherein the flow window and outlet are axially proximate to one another with respect to a longitudinal axis defined by the sleeve.

* * * * *